United States Patent
Nomura et al.

(10) Patent No.: US 11,247,933 B2
(45) Date of Patent: *Feb. 15, 2022

(54) ALKALI-FREE GLASS SUBSTRATE, LAMINATED SUBSTRATE, AND GLASS SUBSTRATE PRODUCTION METHOD

(71) Applicant: AGC INC., Chiyoda-ku (JP)

(72) Inventors: Shuhei Nomura, Tokyo (JP); Kazutaka Ono, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,734

(22) Filed: Feb. 1, 2019

(65) Prior Publication Data
US 2019/0161388 A1    May 30, 2019

Related U.S. Application Data

(63) Continuation of application No. PCT/JP2017/027112, filed on Jul. 26, 2017.

(30) Foreign Application Priority Data

Aug. 5, 2016  (JP) ............... JP2016-154683

(51) Int. Cl.
*B32B 15/04*    (2006.01)
*C03C 3/093*    (2006.01)
(Continued)

(52) U.S. Cl.
CPC .............. *C03C 3/093* (2013.01); *B32B 17/00* (2013.01); *C03B 17/067* (2013.01); *C03C 3/091* (2013.01); *C03B 17/064* (2013.01); *C03B 25/087* (2013.01)

(58) Field of Classification Search
CPC ................. B32B 17/00; C03C 3/091
(Continued)

(56) References Cited

U.S. PATENT DOCUMENTS 5,851,939 A * 12/1998 Miwa ...................... C03C 3/091
501/70
6,329,310 B1 * 12/2001 Peuchert ................ C03C 3/091
501/64
(Continued)

FOREIGN PATENT DOCUMENTS

CN    104276756 A  *  1/2015
JP    11-292563        10/1999
(Continued)

OTHER PUBLICATIONS

CN104276756A translation, 2015.*
(Continued)

*Primary Examiner* — Lauren R Colgan
(74) *Attorney, Agent, or Firm* — Oblon, McClelland, Maier & Neustadt, L.L.P.

(57) ABSTRACT

An alkali-free glass substrate which is a glass substrate includes, as represented by molar percentage based on oxides, 0.1% to 10% of ZnO. The alkali-free glass substrate has an average coefficient of thermal expansion $\alpha_{50/100}$ at 50 to 100° C. of from 2.70 ppm/° C. to 3.20 ppm/° C., an average coefficient of thermal expansion $\alpha_{200/300}$ at 200 to 300° C. of from 3.45 ppm/° C. to 3.95 ppm/° C., and a value $\alpha_{200/300}/\alpha_{50/100}$ obtained by dividing the average coefficient of thermal expansion $\alpha_{200/300}$ at 200 to 300° C. by the average coefficient of thermal expansion $\alpha_{50/100}$ at 50 to 100° C. of from 1.20 to 1.30.

13 Claims, 1 Drawing Sheet

(51) Int. Cl.
*C03B 17/06* (2006.01)
*B32B 17/00* (2006.01)
*C03C 3/091* (2006.01)
*C03B 25/087* (2006.01)

(58) Field of Classification Search
USPC .................................................. 428/426, 428
See application file for complete search history.

(56) References Cited

U.S. PATENT DOCUMENTS

| | | | | |
|---|---|---|---|---|
| 6,417,124 | B1* | 7/2002 | Peuchert | C03C 3/091 313/493 |
| 7,727,916 | B2* | 6/2010 | Peuchert | C03C 3/091 501/66 |
| 2001/0034293 | A1 | 10/2001 | Peuchert et al. | |
| 2002/0001321 | A1 | 1/2002 | Peuchert et al. | |
| 2002/0151426 | A1* | 10/2002 | Murata | C03C 3/091 501/66 |
| 2002/0183188 | A1* | 12/2002 | Peuchert | C03C 3/091 501/66 |
| 2004/0209758 | A1 | 10/2004 | Peuchert et al. | |
| 2006/0003884 | A1* | 1/2006 | Nishizawa | C03C 3/091 501/72 |
| 2009/0226671 | A1* | 9/2009 | Yanase | C03B 17/064 428/156 |
| 2009/0270242 | A1* | 10/2009 | Yanase | C03C 3/091 501/67 |
| 2009/0294773 | A1* | 12/2009 | Ellison | C03C 3/087 257/72 |
| 2013/0065748 | A1* | 3/2013 | Koyama | C03C 3/091 501/67 |
| 2013/0217561 | A1* | 8/2013 | Yang | C03C 3/093 501/67 |
| 2013/0244859 | A1* | 9/2013 | Kawaguchi | C03C 3/091 501/66 |
| 2014/0049708 | A1* | 2/2014 | Murata | C03C 3/087 349/15 |
| 2015/0072130 | A1* | 3/2015 | Tokunaga | C03C 3/087 428/220 |
| 2015/0093561 | A1* | 4/2015 | Tokunaga | C03C 3/091 428/220 |
| 2016/0039710 | A1* | 2/2016 | Tokunaga | C03C 3/087 501/59 |
| 2016/0122229 | A1* | 5/2016 | Bowden | C03C 3/093 501/67 |
| 2017/0247284 | A1* | 8/2017 | Miyasaka | C03C 3/091 |
| 2017/0327408 | A1* | 11/2017 | Nomura | C03B 17/067 |

FOREIGN PATENT DOCUMENTS

| | | |
|---|---|---|
| JP | 3153710 | 4/2001 |
| JP | 2001-220172 | 8/2001 |
| JP | 2001-220173 | 8/2001 |
| JP | 2002-308643 | 10/2002 |
| JP | 2003-335548 | 11/2003 |
| JP | 2006-347796 | 12/2006 |
| WO | WO 2016-194861 A1 | 12/2016 |

OTHER PUBLICATIONS

International Search Report dated Oct. 17, 2017 in PCT/JP2017/027112 filed on Jul. 26, 2017 (with English Translation).
Written Opinion dated Oct. 17, 2017 in PCT/JP2017/027112 filed on Jul. 26, 2017.
White, G. et al. "Thermophysical Properties of Some Key Solids: An Update", International Journal of Thermophysics, vol. 18, No. 5, 1997, pp. 1269-1327, 1287-1289.

* cited by examiner

ALKALI-FREE GLASS SUBSTRATE, LAMINATED SUBSTRATE, AND GLASS SUBSTRATE PRODUCTION METHOD

TECHNICAL FIELD

The present invention relates to an alkali-free glass substrate, a laminated substrate, and a glass substrate production method.

As for an image sensor such as chip size package (CSP), a system of protecting a silicon substrate by laminating a glass substrate thereon is known. A glass for silicon pedestal, in which the elongation percentage by thermal expansion is approximated to the elongation percentage by thermal expansion of the silicon substrate to be bonded with the glass is proposed (for example, see Patent Document 1).

Until now in the semiconductor fabrication process, each of a silicon substrate and a glass substrate is cut in the wafer state, and the silicon substrate and the glass substrate are then laminated together and subjected to a series of fabrication steps, such as die bonding, wire bonding and molding. In recent years, fabrication by a wafer-level packaging technique has the spotlight as a next-generation CSP technique, in which a silicon substrate and a glass substrate are laminated together in the wafer state, subjected to fabrication steps, and then cut.

A heat treatment step is required for laminating together the silicon substrate and the glass substrate. In the heat treatment step, the temperature of a laminated substrate obtained by laminating together the silicon substrate and the glass substrate at a temperature of, for example, 200 to 400° C. is lowered to room temperature. At this time, if there is a difference in the coefficient of thermal expansion between the silicon substrate and the glass substrate, a large residual strain (residual deformation) is caused to occur in the silicon substrate due to a difference in coefficient of thermal expansion.

In the wafer-level packaging technique, the silicone substrate and the glass substrate are laminated together in the wafer state and therefore, even if the difference in coefficient of thermal expansion is at a level heretofore not posed a problem, a residual strain is readily generated in the silicon substrate.

PRIOR ART LITERATURE

Patent Document

Patent Document 1: Japanese Patent No. 3,153,710

Patent Document 1 has proposed glass for silicon pedestal, characterized in that the ratio $\alpha_1/\alpha_2$ of the elongation percentage $\alpha_1$ by thermal expansion of the glass and the elongation percentage $\alpha_2$ by thermal expansion of the silicon base material to be bonded with the glass is from 0.8 to 1.2. However, as regards the glass of Examples disclosed in Patent Document 1, its match in coefficient of thermal expansion with that of the silicon substrate is insufficient, and the wafer-level packaging technique is likely to accompany generation of a residual strain in the silicone substrate.

Accordingly, one embodiment of the present invention provides a glass substrate and a method for manufacturing a glass substrate, in which in the heat treatment step of laminating together a silicon substrate and a glass substrate, the residual strain generated in the silicon substrate is small.

Another embodiment of the present invention provides a laminated substrate including the glass substrate.

Means for Solving the Problems

The present inventors have found that when the composition of the glass, coefficient of thermal expansion thereof, and coefficient of thermal expansion of single-crystal silicon are set to specific ranges, a glass substrate in which the coefficient of thermal expansion matches that of the silicon substrate is obtained. The present invention has been accomplished based on this finding.

A glass substrate of one embodiment of the present invention is an alkali-free glass substrate which includes, as represented by molar percentage based on oxides, 0.1% to 10% of ZnO, and has an average coefficient of thermal expansion $\alpha_{50/100}$ at 50 to 100° C. of from 2.70 ppm/° C. to 3.20 ppm/° C., an average coefficient of thermal expansion $\alpha_{200/300}$ at 200 to 300° C. of from 3.45 ppm/° C. to 3.95 ppm/° C., and a value $\alpha_{200/300}/\alpha_{50/100}$ obtained by dividing the average coefficient of thermal expansion $\alpha_{200/300}$ at 200 to 300° C. by the average coefficient of thermal expansion $\alpha_{50/100}$ at 50 to 100° C. is from 1.20 to 1.30.

A laminated substrate of one embodiment of the present invention includes the glass substrate and a silicon substrate stacked thereon.

A method for manufacturing an alkali-free glass substrate of one embodiment of the present invention includes, a melting step of heating glass raw materials to obtain a molten glass, a forming step of forming the molten glass into a sheet-like shape to obtain a glass ribbon, and a slow cooling step of gradually cooling the glass ribbon to a room temperature state. In the method, the obtained glass substrate has the following composition as represented by molar percentage based on oxides:

$SiO_2$: from 50% to 75%,
$Al_2O_3$: from 6% to 16%,
$B_2O_3$: from 0% to 15%,
MgO: from 0% to 15%,
CaO: from 0% to 13%,
SrO: from 0% to 11%,
BaO: from 0% to 9.5%, and
ZnO: from 0.1% to 10%.

In the method, the composition of the obtained glass substrate and an average cooling rate R (unit: ° C./min) from a temperature at which the viscosity of the glass ribbon becomes $10^{13}$ dPa·s to a temperature at which the viscosity becomes $10^{14.5}$ dPa·s in the slow cooling step satisfy the following conditions (1), (2), (3) and (4):

$0.0177 \times (\text{content of } SiO_2) - 0.0173 \times (\text{content of } Al_2O_3) + 0.0377 \times (\text{content of } B_2O_3) + 0.0771 \times (\text{content of MgO}) + 0.1543 \times (\text{content of CaO}) + 0.1808 \times (\text{content of SrO}) + 0.2082 \times (\text{content of BaO}) + 0.0396 \times (\text{content of ZnO}) + 0.0344 \times \log_{10} R$
is from 2.70 to 3.20         Condition (1):

$0.0181 \times (\text{content of } SiO_2) + 0.0004 \times (\text{content of } Al_2O_3) + 0.0387 \times (\text{content of } B_2O_3) + 0.0913 \times (\text{content of MgO}) + 0.1621 \times (\text{content of CaO}) + 0.1900 \times (\text{content of SrO}) + 0.2180 \times (\text{content of BaO}) + 0.0424 \times (\text{content of ZnO}) + 0.0391 \times \log_{10} R$
is 3.13 to 3.63                Condition (2):

0.0177×(content of SiO$_2$)+0.0195×(content of Al$_2$O$_3$)+0.0323×(content of B$_2$O$_3$)+0.1015× (content of MgO)+0.1686×(content of CaO)+ 0.1990×(content of SrO)+0.2179×(content of BaO)+0.0493×(content of ZnO)+0.0312×log$_{10}$ R is 3.45 to 3.95                          Condition (3):

0.0111×(content of SiO$_2$)+0.0250×(content of Al$_2$O$_3$)+0.0078×(content of B$_2$O$_3$)+0.0144× (content of MgO)+0.0053×(content of CaO)+ 0.0052×(content of SrO)+0.0013×(content of BaO)+0.0121×(content of ZnO)−0.0041×log$_{10}$ R is 1.20 to 1.30                           Condition (4):

[In the conditions (1) to (4), the contents of SiO$_2$, Al$_2$O$_3$, B$_2$O$_3$, MgO, CaO, SrO, BaO, and ZnO are contents as represented by molar percentage based on oxides contained in a obtained glass.]

Advantage of the Invention

One embodiment of the present invention can provide a glass substrate and a method for manufacturing a glass substrate in which the coefficient of thermal expansion of the glass substrate matches that of the silicon substrate, the residual strain generated in the silicon substrate is small in the heat treatment step of laminating together a silicon substrate and a glass substrate, and manufacturing property is excellent. Further, one embodiment of the present invention can provide a laminated substrate including the glass substrate.

BRIEF DESCRIPTION OF THE DRAWINGS

FIG. 1A is a cross-sectional view before lamination together; and FIG. 1B is a cross-sectional view after lamination together.

MODE FOR CARRYING OUT THE INVENTION

One embodiment of the present invention is described below.

In the present description, unless otherwise indicated, the content of each component in the glass substrate and a manufacturing method thereof is as represented by molar percentage based on oxides.

Figure 1A:
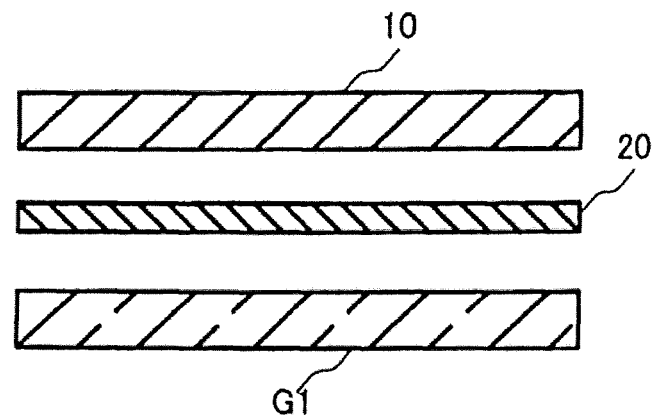
FIG. 1A and FIG. 1B show a glass substrate according to one embodiment of the present invention, which is laminated together with a silicon substrate.
Figure 1B:
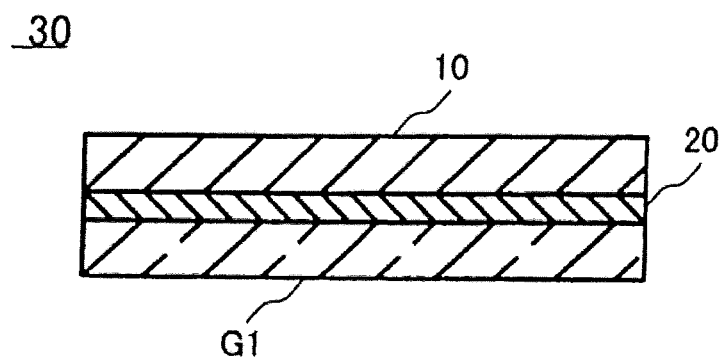

Furthermore, in the present description, unless otherwise indicated, the "-" indicating a numerical value range is used in the sense of including the numerical values before and after that as a lower limit value and an upper limit value FIG. 1A and FIG. 1B show a glass substrate according to one embodiment of the present invention, which is laminated together with a silicon substrate. The glass substrate G1 obtained by the present invention illustrated in FIG. 1A and a silicon substrate 10 sandwich a resin 20 and are laminated together, for example, at a temperature of 200 to 400° C. to obtain a laminated substrate 30 illustrated in FIG. 1B. As the silicon substrate 10, for example, a full-sized wafer (for example, a wafer containing silicon as a component, such as silicon wafer) is used. The silicon substrate 10 may be a wafer formed thereon a device, or a substrate in which a chip (for example, silicon chip), in which a device is cut out from a wafer, is molded with a resin. The resin 20 may be any resin as long as it can withstand the temperature of 200 to 400° C.

In the glass substrate of the present invention, the average coefficient of thermal expansion $\alpha_{50/100}$ at 50 to 100° C. is 2.70 ppm/° C. or more, preferably 2.80 ppm/° C. or more, more preferably 2.90 ppm/° C. or more, still more preferably 2.91 ppm/° C. or more, and especially preferably 2.92 ppm/° C. or more. In addition, $\alpha_{50/100}$ is 3.20 ppm/° C. or less, preferably 3.10 ppm/° C. or less, more preferably 3.00 ppm/° C. or less, still more preferably 2.96 ppm/° C. or less, and especially preferably 2.94 ppm/° C. or less. When $\alpha_{50/100}$ is in the range above, the difference in coefficient of thermal expansion from the silicon substrate can be reduced.

Here, the average coefficient of thermal expansion $\alpha_{50/100}$ at 50 to 100° C. is an average coefficient of thermal expansion as measured by the method prescribed in JIS R3102 (1995), in which the temperature range when measuring the coefficient of thermal expansion is from 50 to 100° C.

In the glass substrate of the present invention, an average coefficient of thermal expansion $\alpha_{100/200}$ at 100 to 200° C. is preferably 3.13 ppm/° C. or more, more preferably 3.23 ppm/° C. or more, still more preferably 3.33 ppm/° C. or more, especially preferably 3.34 ppm/° C. or more, and most preferably 3.35 ppm/° C. or more. In addition, $\alpha_{100/200}$ is preferably 3.63 ppm/° C. or less, more preferably 3.53 ppm/° C. or less, still more preferably 3.43 ppm/° C. or less, especially preferably 3.41 ppm/° C. or less, and most preferably 3.38 ppm/° C. or less. When $\alpha_{100/200}$ is in the range above, the difference in coefficient of thermal expansion from the silicon substrate can be reduced.

Here, the average coefficient of thermal expansion $\alpha_{100/200}$ at 100 to 200° C. is an average coefficient of thermal expansion as measured by the method prescribed in JIS R3102 (1995), in which the temperature range when measuring the coefficient of thermal expansion is from 100 to 200° C.

In the glass substrate of the present invention, the average coefficient of thermal expansion $\alpha_{200/300}$ at 200 to 300° C. is 3.45 ppm/° C. or more, preferably 3.55 ppm/° C. or more, more preferably 3.65 ppm/° C. or more, especially preferably 3.66 ppm/° C. or more, and most preferably 3.68 ppm/° C. or more. In addition, $\alpha_{200/300}$ is 3.95 ppm/° C. or less, preferably 3.85 ppm/° C. or less, more preferably 3.75 ppm/° C. or less, especially preferably 3.73 ppm/° C. or less, and most preferably 3.71 ppm/° C. or less.

When $\alpha_{200/300}$ is in the range above, the difference in coefficient of thermal expansion from the silicon substrate can be reduced. When $\alpha_{200/300}$ is from 3.55 ppm/° C. to 3.85 ppm/° C., the difference in the coefficient of thermal expansion from the silicon substrate can be reduced enough and a failure due to the difference in the coefficient of thermal expansion can be prevented.

Here, the average coefficient of thermal expansion $\alpha_{200/300}$ at 200 to 300° C. is an average coefficient of thermal expansion as measured by the method prescribed in JIS R3102 (1995), in which the temperature range when measuring the coefficient of thermal expansion is from 200 to 300° C.

In the glass substrate of the present invention, the value $\alpha_{200/300}/\alpha_{50/100}$ obtained by dividing the average coefficient of thermal expansion $\alpha_{200/300}$ at 200 to 300° C. by the average coefficient of thermal expansion $\alpha_{50/100}$ at 50 to 100° C. is 1.20 or more, preferably 1.22 or more, and more preferably 1.24 or more. In addition, $\alpha_{200/300}/\alpha_{50/100}$ is 1.30 or less, preferably 1.27 or less, and more preferably 1.26 or less. When $\alpha_{200/300}/\alpha_{50/100}$ is in the range above, the difference in the coefficient of thermal expansion from the silicon substrate can be reduced.

In the glass substrate of the present invention, the absolute value $|\Delta\alpha_{50/100}|$ of the difference between the average coefficient of thermal expansion $\alpha_{50/100}$ of the glass substrate and the average coefficient of thermal expansion of single-crystal silicon at 50 to 100° C., the absolute value $|\Delta\alpha_{100/200}|$ of the difference between the average coefficient of thermal expansion $\alpha_{100/200}$ of the glass substrate and the average coefficient of thermal expansion of single-crystal silicon at 100 to 200° C., and the absolute value $|\Delta\alpha_{200/300}|$ of the difference between the average coefficient of thermal expansion $\alpha_{200/300}$ of the glass substrate and the average coefficient of thermal expansion of single-crystal silicon at 200 to 300° C. are preferably 0.16 ppm/° C. or less, more preferably 0.15 ppm/° C. or less, still more preferably 0.12 ppm/° C. or less.

When $|\Delta\alpha_{50/100}|$, $|\Delta\alpha_{100/200}|$ and $|\Delta\alpha_{200/300}|$ are 0.16 ppm/° C. or less respectively, the difference in the coefficient of thermal expansion from the silicon substrate can be reduced.

The glass substrate of one embodiment of the present invention is an alkali-free glass substrate. In the alkali-free glass substrate, the content of an alkali metal oxide is preferably from 0% to 0.1%. The content of an alkali metal oxide is more preferably 0.05% or less, still more preferably 0.02% or less, and it is particularly preferable to contain substantially no alkali metal oxide. When the content of an alkali metal oxide is 0.1% or less, an alkali ion can hardly diffuse into the silicon substrate in the heat treatment step of laminating together the silicon substrate and the glass substrate.

Here, "contain substantially no alkali metal oxide" means that an alkali metal oxide is not contained at all or an alkali metal oxide may be contained as an impurity mixed unavoidably due to manufacturing reason. The alkali metal oxide includes, for example, $Li_2O$, $Na_2O$, and $K_2O$.

In the glass substrate of one embodiment of the present invention, the content of ZnO is, as represented by molar percentage based on oxides, 0.1% or more, preferably 0.5% or more, more preferably 1% or more, most preferably 2% or more. In order to reduce the difference in the coefficient of thermal expansion from the silicon substrate, it is preferable to reduce the proportion of network modifier (NWM) such as MgO, CaO, SrO, BaO, and ZnO.

On the other hand, it is preferable to increase the proportion of the network modifier in order that while the viscosity during glass melting is reduced, the devitrification temperature is lowered, facility load is reduced, and manufacturing property is improved. The present inventors have found that, of the network modifiers, ZnO can improve manufacturing property without increasing the difference in the coefficient of thermal expansion from the silicon substrate. When the content of ZnO is 0.1% or more, the above-described effects can be fully obtained.

The content of ZnO is preferably 10% or less, more preferably 9% or less, still more preferably 8% or less. When the content of ZnO is 10% or less, crystallization due to ZnO can be suppressed.

The glass substrate of one embodiment of the present invention preferably has the following composition as represented by molar percentage based on oxides:

$SiO_2$: from 50% to 75%,
$Al_2O_3$: from 6% to 16%,
$B_2O_3$: from 0% to 15%,
MgO: from 0% to 15%,
CaO: from 0% to 13%,
SrO: from 0% to 11%, and
BaO: from 0% to 9.5%.

$SiO_2$ is a component forming network of glass. The content of $SiO_2$ is preferably 50% or more, more preferably 55% or more, still more preferably 60% or more, yet still more preferably 65% or more. When the content of $SiO_2$ is 50% or more, the heat resistance, chemical durability and weather resistance are improved. In addition, the content of $SiO_2$ is preferably 75% or less, more preferably 72% or less, still more preferably 70% or less, yet still more preferably 67% or less. When the content of $SiO_2$ is 75% or less, the viscosity during glass melting does not rise excessively, offering good meltability, and the density increases.

The content of $Al_2O_3$ is preferably 6% or more, preferably 8% or more, and more preferably 11% or more. When the content of $Al_2O_3$ is 6% or more, the difference in coefficient of thermal expansion from the silicon substrate is reduced, and the weather resistance, heat resistance and chemical durability are improved. In addition, the content of $Al_2O_3$ is preferably 16% or less, more preferably 15% or less, still more preferably 14% or less, yet still more preferably 13% or less. When the content of $Al_2O_3$ is 16% or less, the viscosity during glass melting does not rise excessively, offering good meltability, devitrification is less likely to occur, and the Young's modulus can be reduced.

$B_2O_3$ is not an essential component, but when contained, the viscosity during glass melting does not rise excessively, offering good meltability, and devitrification is less likely to occur. In the case of containing $B_2O_3$, the content thereof is preferably 3% or more, and more preferably 4% or more. The content of $B_2O_3$ is preferably 15% or less, more preferably 12% or less, and still more preferably 6% or less. When the content of $B_2O_3$ is 15% or less, the glass transition temperature can be raised, and the Young's modulus is increased.

MgO is not an essential component, but when contained, the viscosity during glass melting does not rise excessively, offering good meltability, the weather resistance is enhanced, and the Young's modulus is increased. In the case of containing MgO, the content thereof is preferably 2% or more, more preferably 3% or more, and still more preferably 4% or more. The content of MgO is preferably 15% or less, more preferably 9.5% or less, and still more preferably 9% or less. When the content of MgO is 15% or less, devitrification is less likely to occur.

CaO is not an essential component, but when contained, the viscosity during glass melting does not rise excessively, offering good meltability, and the weather resistance is enhanced. In the case of containing CaO, the content thereof is preferably 0.5% or more, more preferably 1% or more, and still more preferably 3% or more. In addition, the content of CaO is preferably 13% or less, more preferably 10% or less, still more preferably 9% or less, yet still more preferably 8% or less. When the content of CaO is 13% or less, devitrification is less likely to occur, and the Young's modulus can be reduced.

SrO is not an essential component, but when contained, the viscosity during glass melting does not rise excessively, offering good meltability, and the weather resistance is enhanced. In the case of containing SrO, the content thereof is preferably 0.5% or more, more preferably 1% or more. In addition, the content of SrO is preferably 11% or less, more preferably 9% or less, and still more preferably 3% or less. When the content of SrO is 11% or less, devitrification is less likely to occur.

BaO is not an essential component, but when contained, the viscosity during glass melting does not rise excessively, offering good meltability, the weather resistance is enhanced, and the density can be increased. In the case of containing BaO, the content thereof is preferably 0.5% or more, more preferably 1% or more. The content of BaO is preferably 9.5% or less, more preferably 8% or less, and still more preferably 3% or less. When the content of BaO is 9.5% or less, devitrification is less likely to occur.

In the glass substrate of one embodiment of the present invention, the total content (RO) of MgO, CaO, SrO, BaO, and ZnO is preferably 10% or more, more preferably 12% or more, still more preferably 14% or more, and yet still more preferably 15% or more.

When RO is 10% or more, while the viscosity during glass melting is reduced, the devitrification temperature is lowered, facility load is reduced, and manufacturing property can be improved. In addition, RO is preferably 23% or less, more preferably 21% or less, and still more preferably 19% or less. When RO is 23% or less, the coefficient of thermal expansion can be easily matched between the glass substrate and the silicon substrate.

The composition of the glass substrate of one embodiment of the present invention is measured with a commonly used composition analyzer such as X-ray fluorescence analyzer (XRF), energy dispersive X-ray analyzer attached to the scanning electron microscope (SEM-EDX), and electron probe micro analyzer (EPMA).

The glass substrate of one embodiment of the present invention preferably satisfies a relation of (content of $Al_2O_3$)≥(content of MgO). When the relation of (content of $Al_2O_3$)≥(content of MgO) is satisfied, the coefficient of thermal expansion can be easily matched between the glass substrate and the silicon substrate, and the residual strain generated in the silicon substrate in the heat treatment step of laminating together the silicon substrate and the glass substrate is small. In the glass substrate of one embodiment of the present invention, it is preferable that RO is 10% or more and the relation of (content of $Al_2O_3$)≥(content of MgO) is satisfied.

In the case of using the glass substrate of one embodiment of the present invention as a cover glass of CMOS sensor, in order to absorb little visible light, the content of $Fe_2O_3$ is, as represented by mass ppm based on oxides, preferably 200 ppm or less, more preferably 150 ppm or less, still more preferably 100 ppm or less, yet still more preferably 50 ppm or less.

In order to increase the thermal conductivity and improve the meltability, the glass substrate of one embodiment of the present invention preferably contains, as represented by mass ppm based on oxides, more than 200 ppm and 1,000 ppm or less of $Fe_2O_3$. When the content of $Fe_2O_3$ is more than 200 ppm, it becomes possible to increase the thermal conductivity of the glass substrate and improve the meltability. When the content of $Fe_2O_3$ is 1,000 ppm or less, absorption of visible light is not enhanced excessively.

The content of $Fe_2O_3$ is more preferably 300 ppm or more, still more preferably 400 ppm or more, yet still more preferably 500 ppm or more. The content of $Fe_2O_3$ is more preferably 800 ppm or less, still more preferably 700 ppm or less, yet still more preferably 600 ppm or less.

In the glass substrate of one embodiment of the present invention, for example, $SnO_2$, $SO_3$, Cl, or F may be contained as a refining agent.

In the glass substrate of one embodiment of the present invention, for example, $Li_2O$, $WO_3$, $Nb_2O_5$, $V_2O_5$, $Bi_2O_3$, $MoO_3$, $P_2O_5$, $Ga_2O_3$, $I_2O_5$, $In_2O_5$, or $Ge_2O_5$ may be contained so as to improve the weather resistance, meltability, devitrification property, ultraviolet shielding, infrared shielding, ultraviolet transmission, infrared transmission, etc.

In the glass substrate of one embodiment of the present invention, the glass may contain $ZrO_2$, $Y_2O_3$, $La_2O_3$, $TiO_2$, and $SnO_2$ in a combined amount of 2% or less, preferably 1% or less, more preferably 0.5% or less, so as to enhance the chemical durability of glass. Of these, $Y_2O_3$, $La_2O_3$, and $TiO_2$ contribute to improvement of the Young's modulus of the glass.

In the glass substrate of one embodiment of the present invention, considering an environmental load, it is preferred that $As_2O_3$ and $Sb_2O_3$ are not substantially contained.

In the glass substrate of one embodiment of the present invention, the Young's modulus is 76.0 GPa or more, preferably 78 GPa or more, more preferably 80 GPa or more, still more preferably 82 GPa or more. When the Young's modulus is 76.0 GPa or more, cracks and warpage during the slow cooling step in manufacturing glass substrate can be prevented. In addition, damage due to contact with a silicon substrate, a peripheral member, etc. can be prevented.

The Young's modulus is preferably 100 GPa or less, more preferably 90 GPa or less, and still more preferably 87 GPa or less. When the Young's modulus is 100 GPa or less, the glass is prevented from getting brittle and chipping during cutting the glass substrate or dicing is suppressed.

In the glass substrate of one embodiment of the present invention, the thickness thereof is preferably 1.0 mm or less, more preferably 0.8 mm or less, still more preferably 0.7 mm or less, yet still more preferably 0.5 mm or less. When the thickness is 1.0 mm or less, an image sensor can be made compact.

In addition, the thickness is preferably 0.1 mm or more, more preferably 0.2 mm or more, still more preferably 0.3 mm or more. When the thickness is 0.1 mm or more, damage due to contact with a silicon substrate, a peripheral member, etc. can be prevented. Furthermore, self-weight deflection of the glass substrate can be suppressed.

In the glass substrate of one embodiment of the present invention, the area of one main surface is preferably 0.03 $m^2$ or more, more preferably 0.04 $m^2$ or more, still more preferably 0.05 $m^2$ or more. When the area is 0.03 $m^2$ or more, a large-area silicon substrate can be used, and a large number of image sensors can be manufactured from one sheet of the laminated substrate.

The area of one main surface is preferably 0.1 $m^2$ or less. When the area is 0.1 $m^2$ or less, the glass substrate can be easily treated, and damage due to contact with a silicon substrate, a peripheral member, etc. can be prevented. The area of one main surface is more preferably 0.08 $m^2$ or less, still more preferably 0.06 $m^2$ or less.

In the glass substrate of one embodiment of the present invention, the density of defects contained in the glass substrate is preferably 1 defect/$cm^2$ or less, preferably 0.1 defect/$cm^2$ or less, more preferably 0.01 defect/$cm^2$ or less. The defect contained in the glass substrate includes a bubble, a scratch, a metal impurity such as platinum, an unmelted raw material, etc. existing on the surface of or inside the glass substrate and indicates a defect having a size of 1 mm or less and 0.5 μm or more. When the defect is larger than 1 mm, it can be easily discriminated with an eye, and a substrate having a defect can be easily excluded. When the defect is smaller than 0.5 μm, the defect is sufficiently small and less likely to affect the device properties even if the glass substrate is applied as a cover glass of CMOS sensor or LCOS.

In the conventional semiconductor fabrication process, the fabrication process is performed after cutting the glass substrate and therefore, in the case of containing a defect in a glass substrate, the substrate having a defect can be excluded in an early stage of the fabrication process. On the other hand, in the wafer-level packaging, since the laminated substrate is singulated at the end of the fabrication process, in the case of containing a defect in a glass substrate, the glass substrate having a defect can be excluded at the end of the fabrication process. Thus, in the wafer-level packaging, if the density of defects in the glass substrate is increased, the cost rises significantly and therefore, defect control at high level is required.

The shape of the glass substrate of one embodiment of the present invention is not particularly limited and may be a circle, an ellipse, and a rectangle. In order to make the shape of the glass substrate conform to the shape of the silicon substrate, an end of the glass substrate may be formed with a notch or orientation flat. In the case where the glass substrate is circular, part of the outer periphery of the glass substrate may be a straight line.

In the glass substrate of one embodiment of the present invention, the value represented by the following formula (1) is preferably 2.70 or more, more preferably 2.80 or more, still more preferably 2.90 or more, yet still more preferably 2.91 or more, most preferably 2.92 or more. The value represented by the following formula (1) is preferably 3.20 or less, more preferably 3.10 or less, still more preferably 3.00 or less, yet still more preferably 2.96 or less, most preferably 2.94 or less.

$$0.0177 \times (\text{content of SiO}_2) - 0.0173 \times (\text{content of Al}_2\text{O}_3) + 0.0377 \times (\text{content of B}_2\text{O}_3) + 0.0771 \times (\text{content of MgO}) + 0.1543 \times (\text{content of CaO}) + 0.1808 \times (\text{content of SrO}) + 0.2082 \times (\text{content of BaO}) + 0.0396 \times (\text{content of ZnO}) + 0.0344 \times (12.3 + \log_{10} 60 - \log_{10} \eta)$$ Formula (1):

In the glass substrate of one embodiment of the present invention, the value represented by the following formula (2) is preferably 3.13 or more, more preferably 3.23 or more, still more preferably 3.33 or more, yet still more preferably 3.34 or more, most preferably 3.35 or more. The value represented by the following formula (2) is preferably 3.63 or less, more preferably 3.53 or less, still more preferably 3.43 or less, yet still more preferably 3.41 or less, most preferably 3.38 or less.

$$0.0181 \times (\text{content of SiO}_2) + 0.0004 \times (\text{content of Al}_2\text{O}_3) + 0.0387 \times (\text{content of B}_2\text{O}_3) + 0.0913 \times (\text{content of MgO}) + 0.1621 \times (\text{content of CaO}) + 0.1900 \times (\text{content of SrO}) + 0.2180 \times (\text{content of BaO}) + 0.0424 \times (\text{content of ZnO}) + 0.0391 \times (12.3 + \log_{10} 60 - \log_{10} \eta)$$ Formula (2):

In the glass substrate of one embodiment of the present invention, the value represented by the following formula (3) is preferably 3.45 or more, more preferably 3.55 or more, still more preferably 3.65 or more, yet still more preferably 3.66 or more, most preferably 3.68 or more. The value represented by the following formula (3) is preferably 3.95 or less, more preferably 3.85 or less, still more preferably 3.73 or less, yet still more preferably 3.65 or less, most preferably 3.71 or less.

$$0.0177 \times (\text{content of SiO}_2) + 0.0195 \times (\text{content of Al}_2\text{O}_3) + 0.0323 \times (\text{content of B}_2\text{O}_3) + 0.1015 \times (\text{content of MgO}) + 0.1686 \times (\text{content of CaO}) + 0.1990 \times (\text{content of SrO}) + 0.2179 \times (\text{content of BaO}) + 0.0493 \times (\text{content of ZnO}) + 0.0312 \times (12.3 + \log_{10} 60 - \log_{10} \eta)$$ Formula (3):

In the glass substrate of one embodiment of the present invention, the value represented by the following formula (4) is preferably 1.20 or more, more preferably 1.24 or more. The value represented by the following formula (4) is preferably 1.30 or less, more preferably 1.27 or less, still more preferably 1.26 or less.

$$0.0111 \times (\text{content of SiO}_2) + 0.0250 \times (\text{content of Al}_2\text{O}_3) + 0.0078 \times (\text{content of B}_2\text{O}_3) + 0.0144 \times (\text{content of MgO}) + 0.0053 \times (\text{content of CaO}) + 0.0052 \times (\text{content of SrO}) + 0.0013 \times (\text{content of BaO}) + 0.0121 \times (\text{content of ZnO}) - 0.0041 \times (12.3 + \log_{10} 60 - \log_{10} \eta)$$ Formula (4):

In the glass substrate of one embodiment of the present invention, it is preferable that the value represented by the following formula (1) is from 2.70 to 3.20, the value represented by the following formula (2) is from 3.13 to 3.63, the value represented by the following formula (3) is from 3.45 to 3.95, and the value represented by the following formula (4) is from 1.20 to 1.30.

The contents of $SiO_2$, $Al_2O_3$, $B_2O_3$, MgO, CaO, SrO, BaO, and ZnO are contents of each component contained in a obtained glass. $\eta$ is the fictive viscosity (unit: dPa·s).

The fictive viscosity ($\eta$) of glass can be calculated according to the following formula [G. W. Scherer, "Relaxation in Glass and Composites", Wiley, New York (1986), p. 159]:

$$\log_{10} \eta = 12.3 - \log_{10} |q|$$

The unit of $\eta$ is dPa·s, q is an estimated cooling rate, and the unit thereof is ° C./s. The estimated cooling rate q is determined from the glass substrate by the following method. A plurality of glass plate pieces are cut out from one sheet of the glass substrate having a thickness of 1 mm or less. For example, a piece of 1 cm square is cut out as the glass plate piece. The plurality of glass plate pieces cut out are heat-treated and cooled at various cooling rates V, and physical property values of each individual glass plate piece are measured. The cooling start temperature is preferably a sufficiently high temperature not to be affected by the cooling rate and, typically, is preferably on the order of Tg+50° C. to +150° C.

The physical property values measured are not particularly limited, but a density, physical property values closely related to the density (for example, a refractive index), etc. are preferred. A calibration curve A is prepared by plotting the cooling rate ($\log_{10}$ V) on the x-axis and plotting the physical property values of each individual heat-treated glass plate piece on the y-axis. From the physical property values of each individual glass plate piece not having been heat-treated, the estimated cooling rate q of the glass substrate is determined using the prepared calibration curve A.

In the glass substrate one embodiment of the present invention, the weight reduction amount relative to an aqueous hydrofluoric acid solution (HF) (hereinafter, sometimes referred to as HF weight reduction amount) is preferably 0.05 (mg/cm$^2$)/min or more, more preferably 0.07 (mg/cm$^2$)/min or more, still more preferably 0.09 (mg/cm$^2$)/min or more, yet still more preferably 0.11 (mg/cm$^2$)/min or more. HF weight reduction amount is preferably 0.20 (mg/cm$^2$)/min or less, more preferably 0.18 (mg/cm$^2$)/min or less, still more preferably 0.16 (mg/cm$^2$)/min or less, yet still more preferably 0.14 (mg/cm$^2$)/min or less. Here, the HF weight reduction amount is a reduction amount per unit area and unit time [(mg/cm$^2$)/min] when immersing the glass substrate in an aqueous 5 mass % hydrofluoric acid solution at 25° C.

The glass substrate of one embodiment of the present invention is sometimes incorporated as part of a device directly after lamination together with the silicon substrate. For example, the glass substrate is incorporated as a cover glass into a device. In such a case, the glass substrate is preferably subjected to slimming so as to make the device compact. Accordingly, the glass substrate in one embodiment of the present invention preferably has a higher slimming rate. An HF weight reduction amount can be used as an indicator of the slimming rate of the glass substrate.

When the HF weight reduction amount is 0.05 (mg/cm$^2$)/min or more, good productivity is favorably obtained in the slimming step. When the HF weight reduction amount is 0.20 (mg/cm$^2$)/min or less, a failure such that possible unevenness of the etching depth generated in the glass substrate in the slimming step impairs the smoothness of the glass substrate surface can be advantageously prevented.

The glass substrate of the present invention can be applied as a cover glass of a projection-use display device, for example, LCOS. In such a case, if the photoelastic constant of the glass substrate is high, the glass substrate has birefringence due to a stress generated in a device packaging step or in use of the device. As a result, a color change may be caused in light having entered the device, leading to an image quality failure such as color unevenness.

In order to prevent such an image quality failure, in the glass substrate of one embodiment of the present invention, the photoelastic constant is preferably 31 nm/(MPa·cm) or less, more preferably 30.5 nm/(MPa·cm) or less, still more preferably 30 nm/(MPa·cm) or less, yet still more preferably 29.5 nm/(MPa·cm) or less.

In addition, in the glass substrate of one embodiment of the present invention, an α-ray emission amount is preferably 0.5 C/cm$^2$·h or less, more preferably 0.3 C/cm$^2$·h or less, still more preferably 0.1 C/cm$^2$·h or less, and most preferably 0.05 C/cm$^2$·h or less. The unit C means the number of counts.

For example, the glass substrate of one embodiment of the present invention is applied to a cover glass of a device such as image sensor. In this case, when an α-ray generated from the glass substrate enters a device such as image sensor, a hole-electron pair may be induced by the energy of α-ray, giving rise to occurrence of a soft error that is a ray effect of instantaneously producing a bright spot or a white spot on an image.

Therefore, use of a glass substrate with a small α-ray emission amount is likely to prevent such a trouble. When a high-purity raw material having a small radioactive isotope content and a small α-ray emission amount is used as a raw material of the glass substrate, the α-ray emission amount can be decreased.

Furthermore, in a melting/refining step of glass, when a radioactive isotope is prevented from getting mixed in with the molten glass from a furnace material, etc. of a glass manufacturing facility, the α-ray emission amount can be effectively decreased. The "α-ray emission amount" can be measured by a gas flow proportional counter measuring apparatus, etc.

The laminated substrate of one embodiment of the present invention is formed through stacking of the above-described glass substrate and a silicon substrate. Since the difference in coefficient of thermal expansion between the silicon substrate and the glass substrate is small, the residual strain generated in the silicon substrate in the heat treatment step of laminating together the silicon substrate and the glass substrate is small. In addition, the laminated substrate is obtained by, for example, laminating together the glass substrate and the silicon substrate while interposing a resin therebetween.

At this time, the resin thickness, the coefficient of thermal expansion of resin, the heat treatment temperature at the time of lamination together, etc. may affect warpage of the whole laminated substrate. In the laminated substrate of one embodiment of the present invention, the warpage of the whole laminated substrate can be reduced by controlling the coefficient of thermal expansion as in the above-described glass substrate according to one embodiment of the present invention, so that the process margin such as resin thickness, coefficient of thermal expansion of resin and heat treatment temperature at the time of lamination together can be broadened. In the laminated substrate of one embodiment of the present invention, the glass substrate of the present invention described above can be applied.

The method for manufacturing the glass substrate of one embodiment of the present invention is described below. In the case of manufacturing the glass substrate of one embodiment of the present invention, the method includes a melting step of heating glass raw materials to obtain a molten glass, a refining step of removing bubbles from the molten glass, a forming step of forming the molten glass into a sheet-like shape to obtain a glass ribbon, and a slow cooling step of gradually cooling the glass ribbon to a room temperature state.

In the melting step, raw materials are prepared so as to afford a composition of the glass sheet obtained, and the raw materials are continuously charged into a melting furnace and heated preferably at approximately from 1,450 to 1,650° C. to obtain a molten glass.

As the raw material, for example, an oxide, a carbonate, a nitrate, a hydroxide, and a halide such as chloride can be used. In the case where the melting or refining step includes a step of putting the molten glass into contact with platinum, a minute platinum particle may dissolve out into the molten glass and be mixed as an impurity in the glass sheet obtained, but use of a nitrate raw material is effective in preventing the platinum impurity from dissolving out.

As the nitrate, strontium nitrate, barium nitrate, magnesium nitrate, calcium nitrate, etc. can be used. Use of strontium nitrate is more preferred. As for the particle size of the raw material, from a raw material having a large particle diameter of several hundred microns to the extent of not causing an unmelted residue to a raw material having a small particle diameter of about several microns to the extent of causing no scattering during transportation of raw materials and no aggregation as a secondary particle can be appropriately used. A granulated form can also be used. The moisture content of the raw material can also be appropriately adjusted so as to prevent scattering of raw materials. In addition, the melting conditions such as β-OH and oxidation-reduction degree or redox of Fe [$Fe^{2+}/(Fe^{2+}+Fe^{3+})$] can be appropriately adjusted and used.

Next, the refining step is a step of removing bubbles from the molten glass obtained in the above-described melting step. As the refining step, a defoaming process by pressure reduction may be applied. Furthermore, in the glass substrate in the present invention, $SO_3$ or $SnO_2$ can be used as a refining agent. As the $SO_3$ source, a sulfate of at least one element selected from Al, Mg, Ca, Sr, and Ba is preferred; a sulfate of an alkaline earth metal is more preferred; and above all, $CaSO_4.2H_2O$, $SrSO_4$, and $BaSO_4$ are still more preferred because of their remarkable action of making the bubble large.

As the refining agent in the defoaming process by pressure reduction, it is preferred to use a halogen such as Cl and F. As the Cl source, a chloride of at least one element selected from Al, Mg, Ca, Sr, and Ba is preferred; a chloride of an alkaline earth metal is more preferred; and above all, $SrCl_2.6H_2O$ and $BaCl_2.2H_2O$ are still more preferred because of their remarkable action of making the bubble large and their small deliquescency. As the F source, a fluoride of at least one element selected from Al, Mg, Ca, Sr, and Ba is preferred; a fluoride of an alkaline earth metal is more preferred; and above all, $CaF_2$ is still more preferred because of its remarkable action of increasing the meltability of glass raw materials.

Next, the forming step is a step of forming the molten glass deprived of bubbles in the refining step above into a sheet-like shape to obtain a glass ribbon. As the forming step, for example, a float process of flowing the molten glass on a molten metal and thereby forming it into a sheet-like shape to obtain a glass ribbon is applied.

Next, the slow cooling step is a step of gradually cooling the glass ribbon obtained in the forming step above to a room temperature state. In the slow cooling step, the glass ribbon is gradually cooled to a room temperature state such that the average cooling rate from a temperature at which the viscosity is $10^{13}$ dPa·s to a temperature at which the viscosity is $10^{14}$ dPa·s becomes R. The gradually cooled glass ribbon is cut to obtain a glass substrate.

In the method for manufacturing the glass substrate of one embodiment of the present invention, the obtained glass substrate has the following composition as represented by molar percentage based on oxides:

$SiO_2$: from 50% to 75%,
$Al_2O_3$: from 6% to 16%,
$B_2O_3$: from 0% to 15%,
MgO: from 0% to 15%,
CaO: from 0% to 13%,
SrO: from 0% to 11%,
BaO: from 0% to 9.5%, and
ZnO: from 0.1% to 10%.

In the method for manufacturing the glass substrate of one embodiment of the present invention, the composition of the obtained glass substrate and the average cooling rate R (unit: ° C./min) from a temperature at which the viscosity of the glass ribbon becomes $10^{13}$ dPa·s to a temperature at which the viscosity becomes $10^{14.5}$ dPa·s in the slow cooling step satisfy the following conditions (1) to (4).

$0.0177\times$(content of $SiO_2$)$-0.0173\times$(content of $Al_2O_3$)$+0.0377\times$(content of $B_2O_3$)$+0.0771\times$(content of MgO)$+0.1543\times$(content of CaO)$+0.1808\times$(content of SrO)$+0.2082\times$(content of BaO)$+0.0396\times$(content of ZnO)$+0.0344\times\log_{10}$ R is from 2.70 to 3.20    Condition (1):

$0.0181\times$(content of $SiO_2$)$+0.0004\times$(content of $Al_2O_3$)$+0.0387\times$(content of $B_2O_3$)$+0.0913\times$(content of MgO)$+0.1621\times$(content of CaO)$+0.1900\times$(content of SrO)$+0.2180\times$(content of BaO)$+0.0424\times$(content of ZnO)$+0.0391\times\log_{10}$ R is from 3.13 to 3.63    Condition (2):

$0.0177\times$(content of $SiO_2$)$+0.0195\times$(content of $Al_2O_3$)$+0.0323\times$(content of $B_2O_3$)$+0.1015\times$(content of MgO)$+0.1686\times$(content of CaO)$+0.1990\times$(content of SrO)$+0.2179\times$(content of BaO)$+0.0493\times$(content of ZnO)$+0.0312\times\log_{10}$ R is from 3.45 to 3.95    Condition (3):

$0.0111\times$(content of $SiO_2$)$+0.0250\times$(content of $Al_2O_3$)$+0.0078\times$(content of $B_2O_3$)$+0.0144\times$(content of MgO)$+0.0053\times$(content of CaO)$+0.0052\times$(content of SrO)$+0.0013\times$(content of BaO)$+0.0121\times$(content of ZnO)$-0.0041\times\log_{10}$ R is from 1.20 to 1.30    Condition (4):

The value represented by the formula (1) is preferably 2.80 or more, more preferably 2.90 or more. The value represented by the formula (1) is preferably 3.10 or less, more preferably 3.00 or less.

The value represented by the formula (2) is preferably 3.23 or more, more preferably 3.33 or more. The value represented by the formula (2) is preferably 3.53 or less, more preferably 3.43 or less.

The value represented by the formula (3) is preferably 3.55 or more, more preferably 3.65 or more. The value represented by the formula (3) is preferably 3.85 or less, more preferably 3.75 or less.

The value represented by the formula (4) is preferably 1.22 or more, more preferably 1.24 or more. The value represented by the formula (4) is preferably 1.27 or less, more preferably 1.26 or less.

When the values represented by the conditions (1) to (4) is in the range above, the glass substrate having a reduced difference in coefficient of thermal expansion from the silicon substrate can be produced.

The present invention is not limited to the above-described embodiments. Modifications, improvements, etc within the range where the object of the present invention can be achieved are included in the present invention.

For example, in the case of manufacturing the glass substrate of one embodiment of the present invention, the molten glass may be formed into a sheet-like shape by applying a fusion process, a press forming process, etc. in the forming step.

Furthermore, in the case of manufacturing the glass substrate of one embodiment of the present invention, a platinum crucible may be used. In the case of using a platinum crucible, in the melting step, raw materials are prepared to afford a composition of the glass substrate obtained, a platinum crucible containing the raw materials is charged into an electric furnace and heated preferably at approximately from 1,450° C. to 1,650° C. A platinum stirrer is inserted, and stirring is performed for 1 hour to 3 hours to obtain a molten glass.

In the forming step, the molten glass is cast on a carbon plate and formed into a sheet-like shape. In the slow cooling step, the sheet-like glass is gradually cooled to a room temperature state and then cut to obtain a glass substrate.

The glass substrate obtained by cutting may be heated to, for example, approximately Tg+50° C. and then gradually cooled to a room temperature state. The fictive viscosity η can thereby be adjusted.

EXAMPLES

The present invention is specifically described below by referring to Examples, but the present invention is not limited to these Examples.

Various glass raw materials such as silica sand were mixed to afford a glass composition (target composition) shown in Table 1, and, as represented by molar percentage based on oxides, from 0.1% to 1% of a sulfate in terms of $SO_3$, 0.16% of F, and 1% of Cl were added per 100% of raw materials of the prepared target composition. The raw materials were heated and melted with a platinum crucible at a temperature of 1,550° C. to 1,650° C. for 3 hours. In the melting, a platinum stirrer was put, and stirring was performed for 1 hour to achieve homogenization of glass. The molten glass was cast on a carbon plate and formed into a sheet-like shape, the sheet-like glass was put in an electric furnace at a temperature of about Tg+50° C., and the electric furnace was subjected to temperature drop at a cooling rate R (° C./min) and cooled until the glass reached room temperature.

The obtained glass was evaluated for the values determined according to the following formulae (1) to (4), the average coefficient of thermal expansion (unit: ppm/° C.), the density (unit: g/cm³), the Young's modulus (unit: GPa), and the devitrification temperature (unit: ° C.). The results are shown in Table 1, and the blank means the value was not measured.

$$0.0177 \times (\text{content of SiO}_2) - 0.0173 \times (\text{content of Al}_2\text{O}_3) + 0.0377 \times (\text{content of B}_2\text{O}_3) + 0.0771 \times (\text{content of MgO}) + 0.1543 \times (\text{content of CaO}) + 0.1808 \times (\text{content of SrO}) + 0.2082 \times (\text{content of BaO}) + 0.0396 \times (\text{content of ZnO}) + 0.0344 \times (12.3 + \log_{10} 60 - \log_{10} \eta) \quad \text{Formula (1):}$$

$$0.0181 \times (\text{content of SiO}_2) + 0.0004 \times (\text{content of Al}_2\text{O}_3) + 0.0387 \times (\text{content of B}_2\text{O}_3) + 0.0913 \times (\text{content of MgO}) + 0.1621 \times (\text{content of CaO}) + 0.1900 \times (\text{content of SrO}) + 0.2180 \times (\text{content of BaO}) + 0.0424 \times (\text{content of ZnO}) + 0.0391 \times (12.3 + \log_{10} 60 - \log_{10} \eta) \quad \text{Formula (2):}$$

$$0.0177 \times (\text{content of SiO}_2) + 0.0195 \times (\text{content of Al}_2\text{O}_3) + 0.0323 \times (\text{content of B}_2\text{O}_3) + 0.1015 \times (\text{content of MgO}) + 0.1686 \times (\text{content of CaO}) + 0.1990 \times (\text{content of SrO}) + 0.2179 \times (\text{content of BaO}) + 0.0493 \times (\text{content of ZnO}) + 0.0312 \times (12.3 + \log_{10} 60 - \log_{10} \eta) \quad \text{Formula (3):}$$

$$0.0111 \times (\text{content of SiO}_2) + 0.0250 \times (\text{content of Al}_2\text{O}_3) + 0.0078 \times (\text{content of B}_2\text{O}_3) + 0.0144 \times (\text{content of MgO}) + 0.0053 \times (\text{content of CaO}) + 0.0052 \times (\text{content of SrO}) + 0.0013 \times (\text{content of BaO}) + 0.0121 \times (\text{content of ZnO}) - 0.0041 \times (12.3 + \log_{10} 60 - \log_{10} \eta) \quad \text{Formula (4):}$$

In the Tables, the values in parentheses are determined by calculation. The residual amount of $Fe_2O_3$ in the glass was from 50 ppm to 200 ppm as represented by mass ppm based on oxides, and the residual amount of $SO_3$ in the glass was from 10 ppm to 100 ppm as represented by mass ppm based on oxides. Measurement methods of respective physical properties are described below.

(Average Coefficient of Thermal Expansion)

The average coefficient of thermal expansion was measured using a differential dilatometer (TMA) in accordance with the method prescribed in JIS R3102 (1995). The measurement temperature range is from 50 to 100° C. for $\alpha_{50}/\alpha_{100}$, from 100 to 200° C. for $\alpha_{100}/\alpha_{200}$, and from 200 to 300° C. for $\alpha_{200}/\alpha_{300}$.

Here, the average coefficient of thermal expansion of single-crystal silicon was 2.94 ppm/° C. at 50 to 100° C., 3.37 ppm/° C. at 100 to 200° C., and 3.69 ppm/° C. at 200 to 300° C.

(Density)

About 20 g of a bubble-free glass block was measured by the Archimedean method.

(Young's Modulus)

A glass having a thickness of 0.5 mm to 10 mm was measured by the ultrasonic pulse method.

(Devitrification Temperature)

As for the devitrification temperature of the glass, pulverized glass particles were put in a platinum-made dish and heat-treated for 17 hours in an electric furnace controlled at a given temperature, and an average value between a maximum temperature causing precipitation of a crystal inside the glass and a minimum temperature causing no precipitation of a crystal, which were determined by observation with an optical microscope after the heat treatment, was employed.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Composition (mol %) | $SiO_2$ | 66.8 | 66.8 | 66.0 | 66.0 | 66.8 | 65.0 | 66.1 | 55.4 | 67.2 | 65.1 |
| | $Al_2O_3$ | 13.0 | 13.0 | 12.5 | 12.0 | 13.0 | 12.0 | 11.3 | 13.6 | 11.3 | 12.6 |
| | $B_2O_3$ | 4.6 | 4.6 | 4.5 | 7.0 | 4.6 | 4.5 | 7.8 | 6.1 | 10.0 | 6.0 |
| | MgO | 5.0 | 8.0 | 5.0 | 3.0 | 7.3 | 4.0 | 5.1 | 23.0 | 4.6 | 4.0 |
| | CaO | 6.6 | 4.6 | 6.0 | 5.0 | 6.6 | 5.0 | 4.5 | 0 | 5.5 | 1.5 |
| | SrO | 1.0 | 1.0 | 2.0 | 1.5 | 1.0 | 1.4 | 5.2 | 0 | 0 | 1.5 |
| | BaO | 0 | 0 | 0 | 2.0 | 0 | 1.1 | 0 | 0 | 1.4 | 3.7 |
| | ZnO | 3.0 | 2.0 | 4.0 | 3.5 | 0.7 | 7.0 | 0.0 | 1.9 | 0.0 | 5.6 |
| MgO + CaO + SrO + BaO + ZnO | | 15.6 | 15.6 | 17.0 | 15.0 | 15.6 | 18.5 | 14.8 | 24.9 | 11.5 | 16.3 |
| Cooling rate R (° C./min) | | 40 | 100 | 1 | 1 | 40 | 1 | 40 | 1 | 1 | 1 |
| Fictive viscosity $\log_{10} \eta$ (dPa · s) | | 12.5 | 12.1 | 14.1 | 14.1 | 12.5 | 14.1 | 12.5 | 14.1 | 14.1 | 14.1 |
| Formula (1) | | 2.89 | 2.79 | 2.95 | 3.05 | 2.98 | 2.95 | 3.36 | 2.82 | 2.86 | 2.96 |
| Formula (2) | | 3.30 | 3.22 | 3.35 | 3.42 | 3.41 | 3.33 | 3.75 | 3.42 | 3.22 | 3.35 |
| Formula (3) | | 3.60 | 3.53 | 3.67 | 3.68 | 3.72 | 3.64 | 4.01 | 3.87 | 3.43 | 3.63 |
| Formula (4) | | 1.24 | 1.26 | 1.24 | 1.21 | 1.25 | 1.23 | 1.19 | 1.36 | 1.20 | 1.23 |
| Average coefficient of thermal expansion | $\alpha_{50/100}$ | 2.88 | 2.80 | 2.95 | 3.00 | 2.98 | (2.95) | 3.38 | 3.11 | 2.79 | (2.96) |
| | $\alpha_{100/200}$ | 3.26 | 3.16 | 3.33 | 3.37 | 3.36 | (3.34) | 3.75 | 3.64 | 3.14 | (3.37) |
| | $\alpha_{200/300}$ | 3.58 | 3.48 | 3.67 | 3.69 | 3.73 | (3.66) | 4.02 | 4.09 | 3.38 | (3.65) |
| $\alpha_{200/300}/\alpha_{50/100}$ | | 1.24 | 1.24 | 1.24 | 1.23 | 1.25 | (1.24) | 1.19 | 1.31 | 1.21 | (1.23) |
| Density (g/cm$^3$) | | 2.51 | 2.49 | 2.55 | 2.55 | 2.48 | 2.62 | 2.51 | (2.57) | 2.41 | 2.65 |
| Young's modulus (GPa) | | 84.0 | 85.3 | 85.6 | 79.2 | 84.6 | 84.4 | 76.0 | (93.6) | 74.6 | 80.4 |
| Devitrification Temperature (° C.) | | 1315 | 1325 | 1310 | 1305 | 1300 | 1310 | 1270 | | | 1290 |

Examples 1 to 6 and 10 are present examples, and Examples 7 to 9 are comparative examples. In the glass substrates of Examples 1 to 6 and 10 which are present examples, the content of ZnO is from 0.1% to 10% as represented by molar percentage based on oxides, the average coefficient of thermal expansion $\alpha_{50/100}$ is from 2.70 ppm/° C. to 3.20 ppm/° C., the average coefficient of thermal expansion $\alpha_{200/300}$ is from 3.45 ppm/° C. to 3.95 ppm/° C., and the value $\alpha_{200/300}/\alpha_{50/100}$ obtained by dividing the average coefficient of thermal expansion $\alpha_{200/300}$ at 200 to 300° C. by the average coefficient of thermal expansion $\alpha_{50/100}$ at 50 to 100° C. is from 1.20 to 1.30. Consequently, in the heat treatment step of laminating together a silicon substrate and a glass substrate, the residual strain generated in the silicon substrate is likely to be small.

In the glass substrate of Examples 7 to 9, the range of any one of the content of ZnO, $\alpha_{50/100}$, $\alpha_{200/300}$, and $\alpha_{200/300}/\alpha_{50/100}$ deviates from the range regarding the glass substrate in the present invention. Consequently, in the heat treatment step of laminating together a silicon substrate and a glass substrate, the residual strain generated in the silicon substrate is likely to be large.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-154683) filed on Aug. 5, 2016, the entirety of which is incorporated herein by way of reference. In addition, all references cited herein are incorporated in their entirety herein.

INDUSTRIAL APPLICABILITY

In the glass substrate of one embodiment of the present invention, the difference in the coefficient of thermal expansion from the silicon substrate is small, so that in the heat treatment step of laminating together the glass substrate with the silicon substrate and in the subsequent heat treatment step, generation of residual strain attributable to the difference in the coefficient of thermal expansion can be suppressed. Accordingly, the glass substrate is suitable as a glass substrate for an image sensor such as MEMS, CMOS or CIS, for which miniaturization of a device by wafer-level packaging is effective.

In addition, the glass substrate is suitable as a cover glass for a projection-use display device, for example, as a cover glass of LCOS. For example, in LCOS or an image sensor, after forming an electronic circuit on a silicon substrate, the cover glass is adhered to the silicon substrate by using a resin or glass frit as an adhesive material. The glass substrate according to the present invention produces a small difference in the coefficient of thermal expansion from the silicon substrate and therefore, the stress generated on the adhesive interface when the temperature is changed at the time of device manufacture or use is reduced. This promises to reduce color unevenness attributable to photoelastic deformation or enhance the long-term reliability.

Furthermore, the glass substrate of one embodiment of the present invention is suitable as a hole-punched substrate of a glass interposer (GIP) or as a support glass for semiconductor backgrind. Moreover, the glass substrate of one embodiment of the present invention can be suitably used for any application for the glass substrate laminated together with a silicon substrate.

DESCRIPTION OF REFERENCE NUMERALS AND SIGNS

10 Silicon substrate
20 Resin
30 Laminated substrate
G1 Glass substrate

The invention claimed is:

1. An alkali-free glass substrate which is a glass substrate consisting of, as represented by molar percentage based on oxides,
   $SiO_2$: from 50% to 67%,
   $Al_2O_3$: from 11% to 16%,
   $B_2O_3$: from 0% to 15%,
   MgO: from 0% to 15%,
   CaO: from 0% to 13%,
   SrO: from 1% to 11%,
   BaO: from 0% to 9.5%, and
   0.1% to 10% of ZnO,
   having a total content of MgO, CaO, SrO, BaO, and ZnO combined of 15% or more,
   optionally containing one or more components selected from the group consisting of $Fe_2O_3$, $SO_3$, Cl, F, $Li_2O$, $WO_3$, $Nb_2O_5$, $V_2O_5$, $Bi_2O_3$, $MoO_3$, $P_2O_5$, $Ga_2O_3$, $I_2O_5$, $In_2O_5$, $Ge_2O_5$, $ZrO_2$, $Y_2O_3$, $La_2O_3$, $TiO_2$, and $SnO_2$,
   and having an average coefficient of thermal expansion $\alpha_{50/100}$ at 50 to 100° C. of from 2.70 ppm/° C. to 3.20 ppm/° C.,
   an average coefficient of thermal expansion $\alpha_{100/200}$ at 100 to 200° C. of from 3.13 ppm/° C. to 3.63 ppm/° C.,
   an average coefficient of thermal expansion $\alpha_{200/300}$ at 200 to 300° C. of from 3.45 ppm/° C. to 3.95 ppm/° C., and
   a value $\alpha_{200/300}/\alpha_{50/100}$ obtained by dividing the average coefficient of thermal expansion $\alpha_{200/300}$ at 200 to 300° C. by the average coefficient of thermal expansion $\alpha_{50/100}$ at 50 to 100° C. of from 1.20 to 1.30.

2. The alkali-free glass substrate according to claim 1, wherein the average coefficient of thermal expansion $\alpha_{200/300}$ at 200 to 300° C. is from 3.55 ppm/° C. to 3.85 ppm/° C.

3. The alkali-free glass substrate according to claim 1, satisfying a relation of (content of $Al_2O_3$)≥(content of MgO).

4. The alkali-free glass substrate according to claim 1, having a content of $Fe_2O_3$ of 200 ppm or less as represented by mass ppm based on oxides.

5. The alkali-free glass substrate according to claim 1, having a Young's modulus of 76 GPa or more.

6. The alkali-free glass substrate according to claim 1, which is used for at least either one of a support substrate for semiconductor production process and a cover glass.

7. The alkali-free glass substrate according to claim 1, having a thickness of 1.0 mm or less.

8. The alkali-free glass substrate according to claim 1, having an area of one main surface of 0.03 m² or more.

9. The alkali-free glass substrate according to claim 1, having a density of defects with a size of 0.5 μm or more and 1 mm or less contained in the glass substrate of 1 defect/cm² or less.

10. The alkali-free glass substrate according to claim 1, which satisfies:
   0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0396×(content of ZnO)+0.0344×(12.3+$\log_{10}$ 60−$\log_{10}$ η) is from 2.70 to 3.20,
   0.0181×(content of $SiO_2$)+0.0004×(content of $Al_2O_3$)+0.0387×(content of $B_2O_3$)+0.0913×(content of MgO)+0.1621×(content of CaO)+0.1900×(content of SrO)+0.2180×(content of BaO)+0.0424×(content of ZnO)+0.0391×(12.3+$\log_{10}$ 60−$\log_{10}$ η) is 3.13 to 3.63,
   0.0177×(content of $SiO_2$)+0.0195×(content of $Al_2O_3$)+0.0323×(content of $B_2O_3$)+0.1015×(content of MgO)+0.1686×(content of CaO)+0.1990×(content of SrO)+0.2179×(content of BaO)+0.0493×(content of ZnO)+0.0312×(12.3+$\log_{10}$ 60−$\log_{10}$ η) is 3.45 to 3.95, and
   0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+0.0013×(content of BaO)+0.0121×(content of ZnO)−0.0041×(12.3+$\log_{10}$ 60−$\log_{10}$ η) is 1.20 to 1.30,
   wherein the contents of $SiO_2$, $Al_2O_3$, $B_2O_3$, MgO, CaO, SrO, BaO, and ZnO are contents contained in a obtained glass as represented by molar percentage based on oxides, and η is a fictive viscosity (unit: dPa·s).

11. A laminated substrate comprising the alkali-free glass substrate according to claim 1 and a silicon substrate stacked thereon.

12. A method for manufacturing an alkali-free glass substrate according to claim 1, comprising:
- a melting step of heating glass raw materials to obtain a molten glass;
- a forming step of forming the molten glass into a sheet-like shape to obtain a glass ribbon; and
- a slow cooling step of gradually cooling the glass ribbon to a room temperature state,
- wherein an obtained glass substrate has the following composition as represented by molar percentage based on oxides:

$SiO_2$: from 50% to 67%,
$Al_2O_3$: from 11% to 16%,
$B_2O_3$: from 0% to 15%,
MgO: from 0% to 15%,
CaO: from 1% to 13%,
SrO: from 0% to 11%,
BaO: from 0% to 9.5%, and
ZnO: from 0.1% to 10%,
having a total content of MgO, CaO, SrO, BaO, and ZnO combined of 15% or more, and
the composition of the obtained glass substrate and an average cooling rate R (unit: °C./min) from a temperature at which the viscosity of the glass ribbon becomes $10^{13}$ dPa·s to a temperature at which the viscosity becomes $10^{14.5}$ dPa·s in the slow cooling step satisfy the following conditions (1), (2), (3), and (4):

0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0396×(content of ZnO)+0.0344×$\log_{10}$ R is from 2.70 to 3.20    Condition (1):

0.0181×(content of $SiO_2$)+0.0004×(content of $Al_2O_3$)+0.0387×(content of $B_2O_3$)+0.0913×(content of MgO)+0.1621×(content of CaO)+0.1900×(content of SrO)+0.2180×(content of BaO)+0.0424×(content of ZnO)+0.0391×$\log_{10}$ R is 3.13 to 3.63    Condition (2):

0.0177×(content of $SiO_2$)+0.0195×(content of $Al_2O_3$)+0.0323×(content of $B_2O_3$)+0.1015×(content of MgO)+0.1686×(content of CaO)+0.1990×(content of SrO)+0.2179×(content of BaO)+0.0493×(content of ZnO)+0.0312×$\log_{10}$ R is 3.45 to 3.95    Condition (3):

0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+0.0013×(content of BaO)+0.0121×(content of ZnO)−0.0041×$\log_{10}$ R is 1.20 to 1.30    Condition (4):

wherein in the conditions (1) to (4), the contents of $SiO_2$, $Al_2O_3$, $B_2O_3$, MgO, CaO, SrO, BaO, and ZnO are contents contained in a obtained glass as represented by molar percentage based on oxides.

13. The method for manufacturing an alkali-free glass substrate according to claim 12, wherein the molten glass is formed into a sheet-like shape by a fusion process or a press forming process in the forming step.

* * * * *